United States Patent [19]

Foreman

[11] E

[45] Reissued

Patent Number: Re. 31,811

Date of Patent: Jan. 22, 1985

[54] BASEBALL BAT WITH MODIFIED INTERNAL AIR PRESSURE

[76] Inventor: Ronald Foreman, 315 Hidden River Rd., Narberth, Pa. 19072

[21] Appl. No.: 291,563

[22] Filed: Aug. 10, 1981

Related U.S. Patent Documents

Reissue of:

[64] Patent No.: 4,241,919
Issued: Dec. 30, 1980
Appl. No.: 973,039
Filed: Dec. 26, 1978

[51] Int. Cl.[3] ..... A63B 59/06

[52] U.S. Cl. ..... 273/72 A

[58] Field of Search ..... 273/67 R, 72 A, 73 R, 273/73 C, 73 H, 76, 77 R, 78, 82 R, 82 A, 162 R, 167 R, 167 H, 61 D

[56] References Cited

U.S. PATENT DOCUMENTS

| | | | |
|---|---|---|---|
| 1,831,255 | 11/1931 | Menzies | 273/80 B |
| 2,023,131 | 12/1935 | Gibson | 273/80 B |
| 3,233,727 | 2/1966 | Wilson | 273/61 D X |
| 3,479,030 | 11/1969 | Merola | 273/72 A |
| 3,727,295 | 4/1973 | Gildemeister | 273/72 A X |
| 3,929,174 | 12/1975 | Isnardi | 273/61 D X |
| 3,941,380 | 3/1976 | Lacoste | 273/72 A |

FOREIGN PATENT DOCUMENTS

| | | | |
|---|---|---|---|
| 19675 | of 1902 | United Kingdom | 273/78 |
| 834280 | 5/1960 | United Kingdom | 273/76 |

*Primary Examiner*—Anton O. Oechsle
*Attorney, Agent, or Firm*—Karl L. Spivak

[57] ABSTRACT

An aluminum baseball bat with plug of solid rubber or similar material at one end thereof and a knob at the other end is disclosed. The rubber end plug is sealed in place in a leak-proof junction to define a hollow interior space. By inserting a needle through the end plug, fluid communication between a source of air or other gas which is pressurized either above or below atmospheric pressure and the interior of the bat space can be provided to achieve a desired pressure therewithin. Once the desired interior pressure has been achieved, the needle is withdrawn and the natural resiliency of the rubber acts to immediately seal the puncture to thereby permanently maintain the desired interior pressure conditions.

12 Claims, 4 Drawing Figures

BASEBALL BAT WITH MODIFIED INTERNAL AIR PRESSURE

Matter enclosed in heavy brackets [ ] appears in the original patent but forms no part of this reissue specification; matter printed in italics indicates the additions made by reissue.

BACKGROUND OF THE INVENTION

The present invention relates generally to a novel hollow metallic baseball bat, and more particularly, is directed to the method and apparatus resulting therefrom for modifying the interior air pressure of the bat.

It is presently common practice to fabricate baseball bats of solid wood or hollow or filled aluminum construction. The hollow aluminum bats are conventionally formed and shaped of aluminum tubing of suitable wall thickness with the handle end enclosed by a formed aluminum end cap or knob which is secured to the handle construction. The large end or ball striking end of the bat is closed by metal spinning or by a solid rubber plug which is cemented in place. The end plug acts to provide necessary balance weight and closure to produce an entirely satisfactory device. One such bat construction is disclosed in U.S. Pat. No. 3,479,030 to Merola.

In accordance with the present invention, it has been found that the efficiency and capability of a hollow aluminum bat of conventional design can be greatly improved by varying the internal air pressure to achieve optimum results. The improved ball driving characteristics of the modified internal pressure bat have as their basis certain fundamental results which can be explained by some of the concepts of theory of mechanical vibrations.

In accordance with fundamental principles of mechanical vibrations, when a body is set into motion, if the motion is periodic, that is, if it repeats itself with time, this motion is termed vibration. The number of independent variables used to completely specify the configuration of the vibrating system is referred to as the number of degrees of freedom of the system. The response of a body to a disturbance may be analyzed into a number of periodic motions, one periodic motion for each degree of freedom of the body. These periodic motions are called the normal modes of free vibration and each of these normal modes has an associated natural frequency of free vibration.

In order to study the vibratory properties of a body, a knowledge of the free vibration characteristics of the body is important. In particular, in order to predict the response of a body to any external excitation, the natural frequencies of free vibration together with their associated normal modes of vibration must be known. This is due to the fact that the vibratory response of a body due to some disturbing force is composed of a linear combination, or a weighted sum, of all of the individual normal modes of vibration.

In addition, it is important to know the free vibration characteristics of a body in order to know or to calculate the excitation frequencies which would give rise to the phenonmenum called resonance. A system is considered to be in resonance when the exciting force oscillates with a frequency that is the same or nearly the same as one of the natural frequencies of the system, whereby the addition of the frequencies results in a response of the system that becomes very large. The critical structural frequency of a bat as used herein is defined as the resonance condition produced when natural frequencies are modified by modifying the internal air pressure to produce maximum ball striking force.

It should be noted that it is this phenonmenum of resonance that provides the basis of the improved performance of the modified internal pressure bat of the present invention.

With particular reference to the improved bat of the present invention, a hollow aluminum bat consists of an infinite number of particles all coupled together elastically. The bat therefore has an infinite number of degrees of freedom and correspondingly, an infinite number of natural frequencies and modes of vibration. In the context of the present invention, only the lowest frequencies, at most about twenty of these frequencies, are of any practical importance in predicting the response due to an excitation.

In order that the vibration theory above set forth be put to use in describing the highly improved performance of a modified internal pressure bat, the actual mechanics of a bat striking ball and the nature of the response resulting from this motion must first be considered.

In the process of striking a ball with a bat, the batter produces within the bat a vibratory motion. These vibrations are due to an excitation produced by the motion of the bat during the batter's swing and the short duration force or impulse on the bat resulting from the ball making contact with the bat. Along with the energy produced by the batter's swing, this vibratory motion in the bat imparts a force to the ball while the ball is in contact with the bat. The obvious result of this contact is the placement of the ball in flight.

When the bat being used is of the conventional hollow aluminum type with a sealed in place end rubber plug, the vibratory motion produced within the bat is of a frequency much different in magnitude than any of the important natural frequencies of the bat. Because of this difference, resonance is not approached and the force imparted to the ball due to the vibration of the bat is of a nearly negligible amount.

When as in the present invention, the pressure maintained within the hollow aluminum bat is modified, an important effect takes place, namely, significant changes in the natural frequencies and normal modes of vibration of the bat can be noted. The changes in the natural frequencies and the normal modes of vibration of the bat are due to the displaced configuration and the resulting change in the bat's stiffness characteristics which occur due to the modification of the pressure within the hollow chamber or interior of the bat.

SUMMARY OF THE INVENTION

The present invention relates generally to baseball bats, and more particularly is directed to a metallic bat including means to vary the internal pressure maintained within the interior space defined within the bat construction.

In accordance with the teachings of the present invention, a hollow aluminum or other metal bat of conventional manufacture and configuration is produced with a sealed in place end plug affixed at one end thereof in an airtight connection with an air sealed knob at the other end, all of which is well known to those skilled in the art. Preferably, the end plug is constructed of rubber or other similar resilient, dense material.

The present invention starts with the usual hollow, metallic bat construction and then provides means to vary the internal air pressure, either by the introduction of pressurized gas or alternately by removing some of the air already contained within the hollow interior which was entrapped by the affixation of the rubber plug to enclose the end of the bat. In practice, it is contemplated that a hollow needle will be forced through the entire thickness of the rubber plug to communicate the hollow interior channel of the needle with the interior air chamber defined within the bat construction. Then, by attaching a source of pressurized gas or vacuum to the needle, a predetermined pressure, either above or below atmospheric, can be created within the interior of the bat. By quickly withdrawing the needle from the rubber plug, the natural resiliency of the plug body will close the passageway forged by insertion of the needle to thereby quickly seal the impressed pressure or vacuum within the interior space of the bat.

When the hollow aluminum bat is pressurized or is maintained under vacuum conditions, significant changes in the natural frequencies and normal modes of vibration of the bat will occur due to the displaced configuration and the resulting changes in the stiffness characteristics of the bat created by the interior pressure changes.

Predictably, the changes in the natural frequencies and normal modes of vibration due to the pressure or vacuum conditions created within the hollow interior of the bat can have, as most important results, a much improved hitting power of the bat when the bat strikes the ball. This improvement is due to the fact that with the change in the natural frequencies and the normal modes of vibrations, the vibratory motion within the bat can result in an excitation of a frequency very close to one of the important natural frequencies of the pressurized or vacuumized bat. In other words, the vibratory motion of the bat, after being subject to the pressure or vacuum changes, can be designed to approach the resonance condition. Accordingly, the response amplitude of the bat's vibration becomes much more significant. Hence, the force transmitted to the ball due to the vibration of the bat when the bat strikes the ball has a much greater effect on the motion of the ball than an unpressurized bat of the same material.

The addition of an internal pressure or vacuum of a specific amount, depending upon the geometric properties of the hollow aluminum bat, results in significant changes taking place in the magnitudes of the natural frequencies and correspondingly in the nature of the normal modes of vibration of the bat. Because of the fact that the excitation frequency resulting from a batter's attempt to hit the ball is close to one of the important new natural frequencies of vibration, the condition of resonance is approached and the response amplitude of vibration of the bat becomes correspondingly larger. The larger the response amplitude, the larger the resulting force directly upon the ball due to the vibration. Therefore, when utilizing the same effort or swing, the batter is able to impress upon the ball a much larger driving force with the modified bat then he would be able to impress with a conventional, hollow metallic, unpressurized bat. As a result, when using the same swinging force for both a conventional bat and a bat modified in accordance with the teachings of the present invention, a batter is capable of driving a ball a much greater distance upon making proper contact therewith.

It is therefore an object of the present invention to provide a novel, metallic baseball bat with modified interior air pressure.

It is another object of the present invention to provide a novel aluminum baseball bat with a predetermined increased pressure maintained therewithin.

It is another object of the present invention to provide a novel aluminum baseball bat with a predetermined pressure, either above or below atmospheric pressure, maintained therewithin.

It is another object of the present invention to provide a novel aluminum baseball bat with rubber end plug and means to modify the air pressure maintained within the interior space defined with the bat construction.

It is another object of the present invention to provide a method and apparatus for modifying the internal pressure or vacuum maintained within the interior space defined within a hollow aluminum baseball bat.

It is another object of the present invention to provide a novel aluminum baseball bat with means to increase the hitting power of the bat when utilizing the same ball driving force.

It is another object of the present invention to provide a novel aluminum baseball bat with modified interior air pressure of predetermined magnitude to vibrate the bat at critical structural frequency upon striking a ball with the bat.

It is another object of the present invention to provide an aluminum baseball bat that is inexpensive in construction, that is capable of improved ball driving efficiency and which is trouble free when in use.

Other objects and a fuller understanding of the invention will be had by referring to the following description and claims of a preferred embodiment thereof taken in conjunction with the accompanying drawings wherein like reference numbers refer to similar parts throughout the several views and in which:

DESCRIPTION OF THE PREFERRED EMBODIMENT OF THE INVENTION

Figures 1, 2, 3, 4:
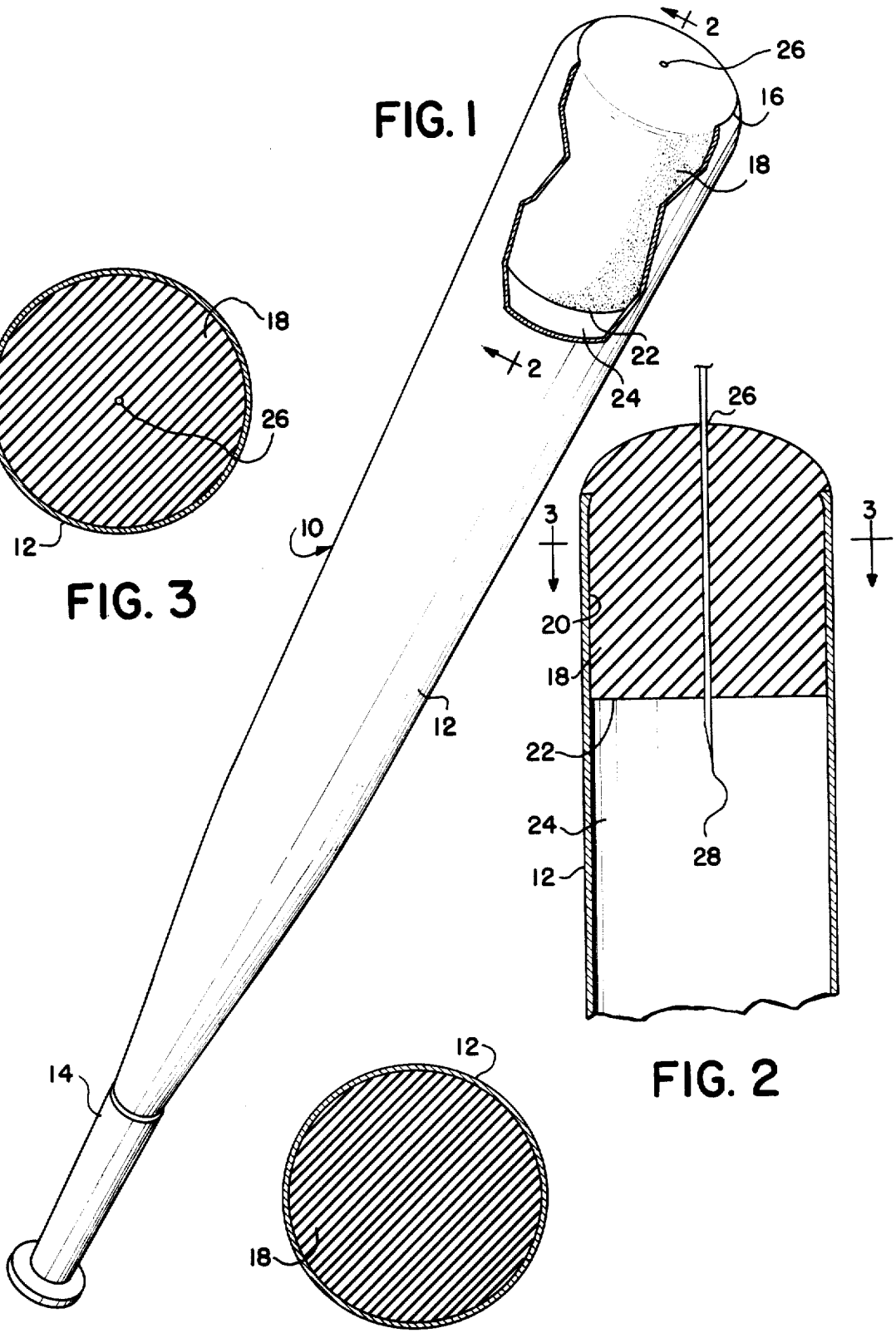
FIG. 1 is a perspective view of a baseball bat constructed in accordance with the teachings of the present invention, partially broken away to expose interior construction details.
FIG. 2 is an enlarged, partial, cross-sectional view taken along line 2—2 of FIG. 1, looking in the direction of the arrows.
FIG. 3 is a cross-sectional view taken along line 3—3 of FIG. 2, looking in the direction of the arrows.
FIG. 4 is a cross-sectional view similar to FIG. 3 showing the needle hole resealed upon removal of the needle.

Although specific terms are used in the following description for the sake of clarity, these terms are intended only to refer to the particular structure of the invention selected for illustration in the drawings and are not intended to define or limit the scope of the invention.

Referring now to the drawings, there is illustrated in FIG. 1 a metallic baseball bat 10 of known type, for example, a hollow aluminum bat similar to that disclosed in U.S. Pat. No. 3,479,030. Such a bat is characterized by an aluminum sidewall construction 12 which terminates at one end in a closed handle 14 with sealed knob and at the other end in an open ball striking end 16. The open ball striking end 16 is closed with a rubber or other resilient end plug 18 which is securely cemented to the interior surfaces 20 of the bat at the open end 16 in a manner to prevent separation when in use.

As illustrated in FIGS. 1 and 2, the interior surface 22 of the rubber end plug 18 and the enclosing sidewalls 12 of the bat 10 define therewithin an interior space 24, which air space 24 formerly was maintained at atmospheric pressure or slightly over atmospheric pressure due to compression of the retained air as the plug 18 was forced into the hollow interior of the bat when assembling the plug in the manner indicated. It is the essence of the present invention to modify the pressure of the air retained within the air space 24 to attain the optimum pressure, either above or below atmospheric pressure, inside of the bat 10 to enable the bat to vibrate at critical structural frequency to thereby impart resonance conditions upon the ball (not illustrated) when the ball is struck by the bat.

In order to achieve such change in internal air pressure, a suitable, sturdy, metallic needle 26 of known design can be pushed, punched or otherwise powered to press the needle 26 through the resilient plug 18 until the needle end 28 communicates with the interior air space 24 which is defined within the bat 10. Then, by connecting the needle 26 to a known source of pressure, such as an air pump (not illustrated) or to a known source of vacuum, such as a vacuum pump (not illustrated), the application of pressure or vacuum forces to the air space 24 can be readily accomplished through the hollow needle 26. In the case of the type of metallic bat in which the end is enclosed by metal (not illustrated) a suitable valve or fitting of known design would have to be employed for use with a suitable gas introduction source.

When the internal air space 24 has been adjusted to the desired pressure conditions which presently are above atmospheric pressure, but which conceivably could also be below atmospheric pressure, the needle 26 is then withdrawn from its association with the rubber plug 18. The natural resiliency of the material comprising the plug 18 acts to close the passageway punched by the entrance of the needle 26 to automatically, permanently seal the opening immediately upon withdrawal of the needle 26 from the plug 18. As illustrated in FIG. 4, upon removal of the needle 26, there will remain no passage or opening through the plug 18 which will permit the escape of pressure or vacuum forces from the air space 24. Further, the cement or other adhesive (not illustrated) which is utilized in known manner to affix the plug 18 to the interior periphery 20 of the bat sidewall 12 will also serve as a seal to prevent air leakage thereabout. Accordingly, once a predetermined internal condition has been impressed within the air space 24, such as employing a needle 26, and the needle has been removed, the pressure or vacuum condition thus created will remain permanently part of the bat construction to provide enhanced performance capability of the novel baseball bat 10.

While it will be appreciated that exhaustive tests have not been completed by the applicant due in part to time considerations and in part to the somewhat inexact nature of test data achievable by striking a ball with a bat and in part to the numerous various hollow bat constructions, the following results are illustrative of applicant's invention.

EXAMPLE 1

A conventional, hollow, aluminum baseball bat with substantially atmospheric internal air pressure and with a rubber end cap cemented in place, such as the aluminum bat manufactured and sold by Ten Pro Corporation, King of Prussia, Pa. was utilized in conventional manner to drive a baseball by swinging the bat against the ball in manner well known to those skilled in the game of baseball. The distance that the ball was driven and the general "feel" of the bat while striking the ball was noted.

EXAMPLE 2

A bat similar in all respects to the bat utilized in Example 1 was pressurized by pushing, punching or otherwise inserting a hollow metallic needle through the end plug until the one end of the needle was in fluid communication with the interior air space defined within the hollow bat. The other end of the needle was then connected in usual manner to a source of pressure, for example, an air pump and a pressure of 6 psi above atmospheric pressure was introduced into the hollow interior of the bat and maintained. The needle was then withdrawn from its association with the plug and the natural resiliency of the plug material acted to immediately and automatically close the channel or path which was created by the insertion of the needle through the plug whereby the introduced, increased air pressure was permanently sealed within the hollow bat interior space.

The bat was then utilized to strike a baseball in the same manner employed in Example 1. Greatly increased efficiency and ball driving force was noted. Utilizing substantially the same effort and the same swing characteristics as in Example 1, it was noted that the bat had much greater effect on the motion of the ball and the ball was driven considerably further when utilizing approximately the same swinging force.

EXAMPLE 3

Employing the same type of bat as in Example 1, and utilizing the same needle and pressure source as in Example 2, an internal air pressure within the hollow interior of the bat of 20 psi was impressed and the needle was quickly withdrawn without air leakage or pressure drop. The bat was again employed to strike a ball by utilizing substantially the same swing and the same effort as employed in Example 1. Under these conditions, it was found that the feel of the bat striking the ball was "dead" and that the operator was unable to drive the ball even as far as in Example 1 when utilizing an unmodified internal pressure bat.

EXAMPLE 4

A bat similar to that of Example 1 was pressurized using a needle and pressure source similar to Example 2 to achieve an internal air pressure of 14 psi. The needle was then quickly withdrawn without air leakage and the bat was again employed by the operator to drive a baseball as in Examples 1 and 2. Under these conditions, the feel of the bat striking the ball was "dead" and again the operator was unable to drive the ball even as far as Example 1 when utilizing an unmodified internal pressure bat.

From the foregoing examples, it can be concluded that the amount of internal air pressure maintained interiorly of a bat greatly affects its resonance frequency.

When a hollow aluminum bat of the type described is pressurized to 6 psi and is utilized to propel a baseball, the vibrations generated by the bat striking the ball approach the critical structural frequency of this particular bat. The resonance frequency produces an improved performance whereby the force transmitted from the bat to the ball due to the vibrations set up in the bat has a much greater and improved effect on the motion of the ball that when utilizing an unpressurized bat of the same construction.

The test results further show that internal pressures of 20 psi and 14 psi fail to produce critical structural frequency when the vibrations caused by bat striking ball are set up. At these pressures, it can be observed that the amplitude of vibration due to excitation and the natural frequencies of free vibration of the bat are not additive and the bat is not in resonance.

It is anticipated that other conditions of internal pressure or internal vacuum may be found when testing hollow metallic bats which also will result in enhanced bat performance. Also, additional testing will be required when utilizing the hollow aluminum bats of various manufacturers to determine the critical structural frequency of each such bat. Such variables as the natural frequency of each bat construction when coupled with the excitation frequencies of such bats must be considered to achieve resonance, that is the critical structural frequency necessary to achieve maximum driving force applied to the ball at the moment the ball is struck by the bat.

Although the invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited to the foregoing specification but rather only by the scope of the claims appended hereto.

What is claimed is:

1. A metallic bat comprising sidewalls which terminate at one end in a closed end and at the other end in an open end, the open end being closed with a resilient end plug secured to the interior surface of the sidewalls to define an interior space capable of maintaining a quantity of confined gas therewithin, the confined gas being characterized by a pressure other than atmospheric, the resilient end plug having a passage therethrough in communication with the interior space, the passage being open when a pressure introducing needle is inserted through the plug to introduce gas into the interior space and the passage being closed when the needle is withdrawn to seal the said interior space,

*the said pressure being appropriate to produce a natural frequency of free vibration of such frequency and amplitude in the bat that when coupled with the excitation frequency caused by the impact of the bat striking a ball, resonance results.*

2. The bat of claim 1 wherein the said pressure is approximately 6 psi greater than atmospheric.

3. The bat of claim 1 wherein the pressure is less than atmospheric.

4. The method of modifying the initial pressure of a gas entrapped within the interior of a metallic baseball bat of the type having an interior space defined by the bat sidewalls and having one closed end and one open end, the open end being closed by a resilient plug, comprising the steps of forming an opening through the resilient plug part of the bat construction in communication with the interior space by forcing a hollow conduit therethrough until its inner end reaches the interior space and its outer end extends outwardly of the plug;

determining the critical structural frequency of the bat;

introducing a gas at a pressure other than the initial pressure to the outer end of the conduit and forcing the gas through the conduit to establish the final pressure of the gas in the interior space;

pressurizing the gas to a final pressure necessary to achieve critical structural frequency in the bat; and removing the conduit and automatically closing the opening through the resilient plug and maintaining the final pressure of the gas in the interior space.

5. The method of claim 4 including the step of pressurizing the gas to a final pressure of approximately 6 psi *greater than atmospheric pressure.*

*6. In a metallic bat construction of the type comprising sidewalls and closed first and second ends defining an interior space and capable of maintaining a quantity of confined gas therewithin, the improvement comprising*

*gas passage means in the bat construction in fluid communication with the interior space to pass gas therethrough,*

*the confined gas being characterized by a pressure that is other than atmospheric, and*

*the said pressure being appropriate to produce a natural frequency of free vibration of such frequency and amplitude in the bat that when coupled with the excitation frequency caused by the impact of the bat striking a ball, resonance results.*

*7. The bat of claim 6 wherein the said pressure is approximately 6 psi greater than atmospheric.*

*8. The bat of claim 6 wherein the pressure is less than atmospheric.*

*9. The method of modifying the initial pressure of a gas entrapped within the interior of a metallic baseball bat of the type having an interior space defined by the bat sidewalls and having a first closed end, a second closed end and gas passage means in fluid communication with the interior space, comprising the steps of determining the critical structural frequency of the bat;*

*introducing a gas at a pressure other than atmospheric pressure to the gas passage means and forcing the gas through the gas passage means to establish the final pressure of the gas in the interior space;*

*pressurizing the gas to a final pressure necessary to achieve critical structural frequency in the bat; and maintaining the final pressure of the gas in the interior space.*

*10. The method of claim 9 including the step of pressurizing the gas to a final pressure of approximately 6 psi greater than atmospheric.*

*11. The bat of claim 6 wherein the pressure is greater than atmospheric.*

*12. The method of claim 9 including the step of pressurizing the gas to a final pressure that is greater than atmospheric.*

* * * * *